(12) United States Patent
Ohta et al.

(10) Patent No.: US 9,318,983 B2
(45) Date of Patent: Apr. 19, 2016

(54) MOTOR CONTROLLER

(71) Applicants: SINFONIA TECHNOLOGY CO., LTD., Minato-ku (JP); IHI AEROSPACE CO., LTD., Koto-ku (JP)

(72) Inventors: Yoshito Ohta, Minato-ku (JP); Keisuke Onishi, Minato-ku (JP); Hitoshi Oyori, Koto-ku (JP)

(73) Assignees: SINFONIA TECHNOLOGY CO., LTD., Minato-ku (JP); IHI AEROSPACE CO., LTD., Koto-ku (JP)

( * ) Notice: Subject to any disclaimer, the term of this patent is extended or adjusted under 35 U.S.C. 154(b) by 0 days.

(21) Appl. No.: 14/560,406

(22) Filed: Dec. 4, 2014

(65) Prior Publication Data
US 2015/0162857 A1    Jun. 11, 2015

(30) Foreign Application Priority Data
Dec. 5, 2013   (JP) .................... 2013-252260

(51) Int. Cl.
H02P 6/00      (2006.01)
H02P 29/02     (2006.01)
H02P 21/00     (2006.01)

(52) U.S. Cl.
CPC ............ H02P 6/002 (2013.01); H02P 21/0035 (2013.01); H02P 29/023 (2013.01)

(58) Field of Classification Search
CPC ... H02P 21/06; H02P 21/0035; H02P 21/146; H02P 21/10; H02P 21/0042; H02P 21/085; H02P 6/145; H02P 21/0089; H02P 21/145; H02P 21/148; H02P 29/022; H02P 29/023; H02P 21/0003; H02P 21/0039

USPC ................ 318/400.02, 400.23, 432, 437, 727
See application file for complete search history.

(56) References Cited

U.S. PATENT DOCUMENTS

| 5,568,034 | A | 10/1996 | Huggett et al. | |
|---|---|---|---|---|
| 6,982,533 | B2 * | 1/2006 | Seibel ................. | H02P 21/0042 318/432 |
| 7,095,209 | B2 * | 8/2006 | Thunes ................. | H02P 21/10 318/727 |
| 7,141,948 | B2 * | 11/2006 | Kifuku ................. | B62D 5/0481 318/432 |

(Continued)

FOREIGN PATENT DOCUMENTS

| JP | 6-280587  | 10/1994 |
|---|---|---|
| JP | 9-172781  | 6/1997  |

(Continued)

OTHER PUBLICATIONS

Extended European Search Report issued May 4, 2015 in Patent Application No. 14195199.6.

Primary Examiner — Paul Ip
(74) Attorney, Agent, or Firm — Oblon, McClelland, Maier & Neustadt, L.L.P.

(57) ABSTRACT

A 0-axis current calculator 7 configured to calculate a target value of the 0-axis current by setting the current of the open phase to be zero when one of the phases becomes open, or determines that the target value of the 0-axis current is zero when there is no open phase is provided. Based on the target values of the d-axis current and the q-axis current, the target value of the 0-axis current calculated by the 0-axis current calculator 7, and the d-axis current, the q-axis current, and the 0-axis current transformed by the d-q-0 transformer 8, the current supplied to each phase of the motor are controlled.

1 Claim, 4 Drawing Sheets

(56) References Cited

U.S. PATENT DOCUMENTS

| | | | |
|---|---|---|---|
| 7,145,310 B2* | 12/2006 | Ihm | H02P 21/06 318/700 |
| 7,161,317 B2* | 1/2007 | Matsushita | H02P 21/0035 180/443 |
| 7,170,256 B2* | 1/2007 | Iwashita | H02P 6/145 318/400.01 |
| 2002/0113615 A1* | 8/2002 | Atarashi | B60L 11/1803 318/400.01 |
| 2003/0085627 A1 | 5/2003 | Lipo et al. | |
| 2005/0007044 A1* | 1/2005 | Qiu | H02P 21/13 318/400.02 |
| 2005/0057208 A1* | 3/2005 | Seibel | H02P 21/0042 318/432 |
| 2006/0012327 A1* | 1/2006 | Iwashita | H02P 6/145 318/717 |
| 2006/0043917 A1* | 3/2006 | Kifuku | B62D 5/0481 318/432 |
| 2006/0066275 A1* | 3/2006 | Thunes | H02P 21/10 318/432 |
| 2006/0076832 A1* | 4/2006 | Matsushita | H02P 21/0035 307/10.1 |
| 2006/0132082 A1* | 6/2006 | Ihm | H02P 21/06 318/717 |
| 2007/0176577 A1* | 8/2007 | Kezobo | B62D 5/046 318/807 |
| 2009/0096394 A1 | 4/2009 | Taniguchi | |
| 2009/0256518 A1* | 10/2009 | Kitanaka | H02P 21/0042 318/802 |
| 2011/0210687 A1* | 9/2011 | Tsuji | H02P 21/0003 318/400.02 |
| 2011/0221366 A1 | 9/2011 | Gallegos-Lopez et al. | |
| 2012/0256572 A1 | 10/2012 | Oyori et al. | |
| 2014/0145665 A1* | 5/2014 | Shouji | B60L 15/025 318/503 |
| 2014/0375239 A1* | 12/2014 | Kim | H02P 6/10 318/400.23 |

FOREIGN PATENT DOCUMENTS

| | | |
|---|---|---|
| JP | 2007-99066 | 4/2007 |
| JP | 2009-95170 | 4/2009 |
| JP | 2009-268332 | 11/2009 |
| JP | 2012-222881 | 11/2012 |
| WO | WO 2005/091488 A1 | 9/2005 |

* cited by examiner

NORMAL STATE

ABNORMAL STATE

MOTOR CONTROLLER

CROSS REFERENCE TO RELATED APPLICATION

The present application claims priority from Japanese Patent Application No. 2013-252260, which was filed on Dec. 5, 2013, the disclosure of which is herein incorporated by reference in its entirety.

BACKGROUND OF THE INVENTION

The present invention relates to a controller of a motor, and particularly relates to a motor controller that is able to continue suitable driving even when an open phase failure occurs and no current runs in one of three or more phases of a polyphase motor.

An AC motor in which coils of multiple phases of stators are connected to an inverter is called brushless motor. Such brushless motors are widely used on account of smallness, low power consumption, and long life as compared to brushed motors. A typical example of the brushless motors is a polyphase motor in which coils of three or more phases are connected in star connection. An inverter connected to a DC power source is controlled in accordance with a target torque, and an alternate current is supplied to the coil of each phase.

A polyphase motor of this type, which is used for applications requiring high reliability such as airplanes, is required to continue driving even when an open phase failure occurs and no current flows in one of the phases on account of reasons such as a disconnection in the motor or the inverter. In response to such a request, motor controllers each of which allows the motor to continue driving even if one of phases becomes open have been proposed (see, e.g., Patent Literature 1 (Japanese Unexamined Patent Publication No. H06-280587), Patent Literature 2 (Japanese Unexamined Patent Publication No. 2012-222881), Patent Literature 3 (Japanese PCT application entering national phase in Japan No. WO2005/091488, and Patent Literature 4 (Japanese Unexamined Patent Publication No. 2007-99066)).

The motor controller recited in Patent Literature 1 includes: switching elements provided between a stator neutral point and a cathode of a DC input terminal of an inverter and between a stator neutral point and an anode of the DC input terminal; a current detector configured to detect a current of each coil; an open phase detector configured to perform open phase detection based on a signal from the current detector; and a switching pattern storage configured to store a switching pattern of each of the above-described switching elements and each of switching elements in the inverter, in accordance with an open phase in each phase. When open phase is detected, the switching pattern corresponding to the phase which is open is fetched and the switching of each switching element is controlled.

The motor controller recited in Patent Literature 2 includes: a neutral line connecting a neutral point of a power source with a neutral point of a star connection; a failure detector configured to detect a failure in a coil of each phase; and a failed phase determination unit configured to determine whether a failure has occurred in each phase, based on an output from the failure detector. The motor controller changes the phase of each current in such a way that the locus of the vector of a synthetic current, which is formed by resolving the current of each phase which is determined as not having a failure by the failed phase determination unit into a component orthogonal to the X axis and a component orthogonal to the Y axis and then synthesizing these components, is substantial circular.

The motor controller recited in Patent Literature 3 includes: a current controlling unit configured to determine a multiphase voltage instruction in accordance with a target q-axis current which is equivalent to a target torque, a detected current of each phase, and a motor rotational angle; a normal current controlling unit which is used in a normal state without open phase, and an abnormal current controlling unit which is used in an abnormal state with open phase. One of these controlling units is selected by a switching unit, and the switching elements of the inverter are driven by performing pulse width modulation of the multiphase voltage instruction from the current controlling unit, so that a current is supplied from the inverter to each phase. The abnormal current controlling unit includes: a target phase current shaping unit configured to output, as a multiphase target current, a target current of each phase in accordance with a target q-axis current and a motor rotational angle so that an equilibrium condition in which the sum of the target currents of the respective phases other than the open phase is zero is satisfied; a two-phase transformer configured to perform two-phase transformation of the multiphase target current in accordance with the motor rotational angle, so as to generate a shaped d-axis target current and a shaped q-axis target current; and a dq controlling unit configured to perform dq control based on the shaped d-axis target current, the shaped q-axis target current, the detected current of each phase, and the motor rotational angle, so as to generate a multiphase voltage instruction. The target phase current shaping unit individually specifies the target current of each phase, and the dq control is executed in such a way that the shaped d-axis target current and the shaped q-axis target current are set as the target signals of the d-axis current and the q-axis current.

The motor controller recited in Patent Literature 4 is arranged such that a neutral point of coils of three phases arranged in star connection are connected to a neutral point driving circuit, and a switching unit which is controlled to be turned off in a phase abnormal state is provided to be in series with the coils of the respective phases. A motor controller of a motor driving circuit with which the coils of the respective phases are connected includes a normal-state control map for dq conversion of induced voltage waveforms of the coils of normal three phases and an abnormal-state control map for dq conversion of induced voltage waveforms of the coils of the remaining two phases at the time of open phase. The dq control is carried out with the normal-state control map in the normal state or with the abnormal-state control map in the abnormal state.

SUMMARY OF THE INVENTION

In the arrangement recited in Patent Literature 1, because switching elements are provided between a stator neutral point and a cathode of a DC input terminal of an inverter and between a stator neutral point and an anode of the DC input terminal and the switching patterns of these switching elements and each switching element in the inverter are changed in accordance with the state of the open phase, the switching of the switching elements takes time and the control is complicated.

In the arrangement shown in Patent Literature 2, a neutral line is provided and the phases of the currents of the remaining normal phases are changed and the currents flowing to these phases are amplified, with the result that the decrease in the torque due to the open phase is compensated. In this arrangement, however, the advantages of the vector control are not obtained because the current of each phase is individually controlled. The vector control by dq conversion, which is widely used in motor control, is advantageous in that, for example, the electrification to the q axis generating the magnet torque is efficiently done, the electrification to the d axis where reluctance torque is generated by an IPM (Interior Permanent Magnet) motor is easily done, and flux weakening control (also called field weakening control) by the d-axis current is possible.

In the arrangements recited in Patent Literatures 3 and 4, the advantages of the vector control by the dq conversion are obtained, but the control is complicated because it is necessary to switch the current controlling unit and the control map between the normal state and the abnormal state. Furthermore, the current controlling unit and the control map in the abnormal state, which are not frequently used, are susceptible to bugs. Furthermore, in the arrangement shown in Patent Literature 3, no neutral line is provided and only the currents of the remaining phases are controlled. This arrangement is disadvantageous in that the torque is not stable in the occurrence of open phase because, for example, a zero point occurs in the generated torque due to the constraints of this control.

In the arrangement shown in Patent Literature 4, no zero point occurs in the generated torque due to the presence of the neutral line, but output control to certainly cause the current of the open phase to be zero is not achieved on account of the reasons below, as the feedback control is executed only for the d-axis current and the q-axis current. (1) An induced voltage is generated in accordance with the rotation of the motor and a gain of the motor driving system is changed by a voltage variation due to the induced voltage, and hence control characteristic is different even if the same dq-axis voltage is instructed. (2) It is impossible to completely match the characteristics of the respective phases of the motor with one another, and hence there is a difference between the phases in impedance or the like. For this reason, a suitable instruction value of the dq-axis voltage varies in accordance with which one of the phases has become open. (3) The control has a dead band due to a dead time in the control circuit, and an actual voltage waveform in response to the dq-axis instruction voltage is skewed. As the control output is not suitably done on account of these disturbance factors inherent to the motor, the robustness is low. To obtain a suitable control output, a table of dq-axis instruction voltages may be prepared in consideration of the disturbance factors. Such a table, however, is not practical on account of its huge size.

An object of the present invention is to provide a motor controller which excels in robustness, is able to make most of the advantages of vector control, and is able to obtain a stable torque at the time of open phase, with the same control loop as in a normal state.

To solve the problem above, the present invention employs a motor controller including: an inverter configured to apply a voltage to each phase of a motor having coils of three or more phases arranged in star connection so as to supply an alternate current to each phase; a phase current detector configured to detect the current flowing in each phase of the motor; and a magnetic pole detector configured to detect a magnetic pole rotational position of the motor, the current supplied to each phase of the motor being controlled based on target values of a q-axis current and a d-axis current which are equivalent to target torque, a current of each phase detected by the phase current detector, and the magnetic pole rotational position detected by the magnetic pole detector, the motor controller further including: a neutral line which grounds a neutral point of the star connection; a d-q-0 transformer configured to transform the current of each phase detected by the phase current detector to a rectangular coordinate system of the d-axis current, the q-axis current, and a 0-axis current, by using the magnetic pole rotational position detected by the magnetic pole detector as a parameter; and a 0-axis current calculator configured to calculate a target value of the 0-axis current by setting the current of the open phase to be zero when one of the phases of the motor becomes open and no current flows to the one of the phases, or determines that the target value of the 0-axis current is zero when there is no open phase, and based on the target values of the d-axis current and the q-axis current, the target value of the 0-axis current calculated by the 0-axis current calculator, and the d-axis current, the q-axis current, and the 0-axis current transformed by the d-q-0 transformer, the current supplied to each phase of the motor being controlled.

To put it differently, in the present invention, a neutral line which grounds a neutral point of star connection, a d-q-0 transformer which is configured to transform a current of each phase detected by a phase current detector into a rectangular coordinate system of a d-axis current, a q-axis current, and a 0-axis current by using a magnetic pole rotational position detected by a magnetic pole detector as a parameter, and a 0-axis current calculator which is configured to calculate a target value of the 0-axis current by setting the current in open phase at zero when open phase occurs and no current flows in one of the phases of the motor or calculate the target value of the 0-axis current to be zero when no open phase occurs. Because the currents supplied to the respective phases of the motor are controlled based on the target values of the d-axis current and the q-axis current, the target value of the 0-axis current calculated by the 0-axis current calculator, and the d-axis current, the q-axis current, and the 0-axis current transformed by the d-q-0 transformer, high robustness is achieved as a suitable control output in which the current of the open phase is zero is obtained in spite of the disturbance factors. Furthermore, making most of the advantages of the vector control, a stable torque is obtained even at the time of open phase by the same control loop as in the normal state, without switching the control loop between the normal state without open phase and the abnormal state with open phase.

A stable torque is obtained when two or more phases remain at the time of open phase. When the number of the phases of the motor is four or more, even if more than one phase are open, a stable torque is obtained by setting a target value of a 0-axis current so that the currents of open phases are zero.

In the motor controller of the present invention, a neutral line which grounds a neutral point of star connection, a d-q-0 transformer which is configured to transform a current of each phase detected by a phase current detector into a rectangular coordinate system of a d-axis current, a q-axis current, and a 0-axis current by using a magnetic pole rotational position detected by a magnetic pole detector as a parameter, and a 0-axis current calculator which is configured to calculate a target value of the 0-axis current by setting the current in open phase at zero when open phase occurs and no current flows in one of the phases of the motor or calculate the target value of the 0-axis current to be zero when no open phase occurs. Because the currents supplied to the respective phases of the motor are controlled based on the target values of the d-axis current and the q-axis current, the target value of the 0-axis current calculated by the 0-axis current calculator, and the d-axis current, the q-axis current, and the 0-axis current transformed by the d-q-0 transformer, high robustness is achieved, the advantages of the vector control are made use of, and a stable torque is obtained at the time of open phase by the same control loop as in the normal state.

BRIEF DESCRIPTION OF THE DRAWINGS

FIG. 3A is a graph showing current target values of d, q, and 0-axes in the control in the normal state, whereas

FIG. 4A is a graph showing current target values of d, q, and 0-axes in the control in an abnormal state in which a phase W is open, whereas

DESCRIPTION OF THE PREFERRED EMBODIMENTS

Figure 1:
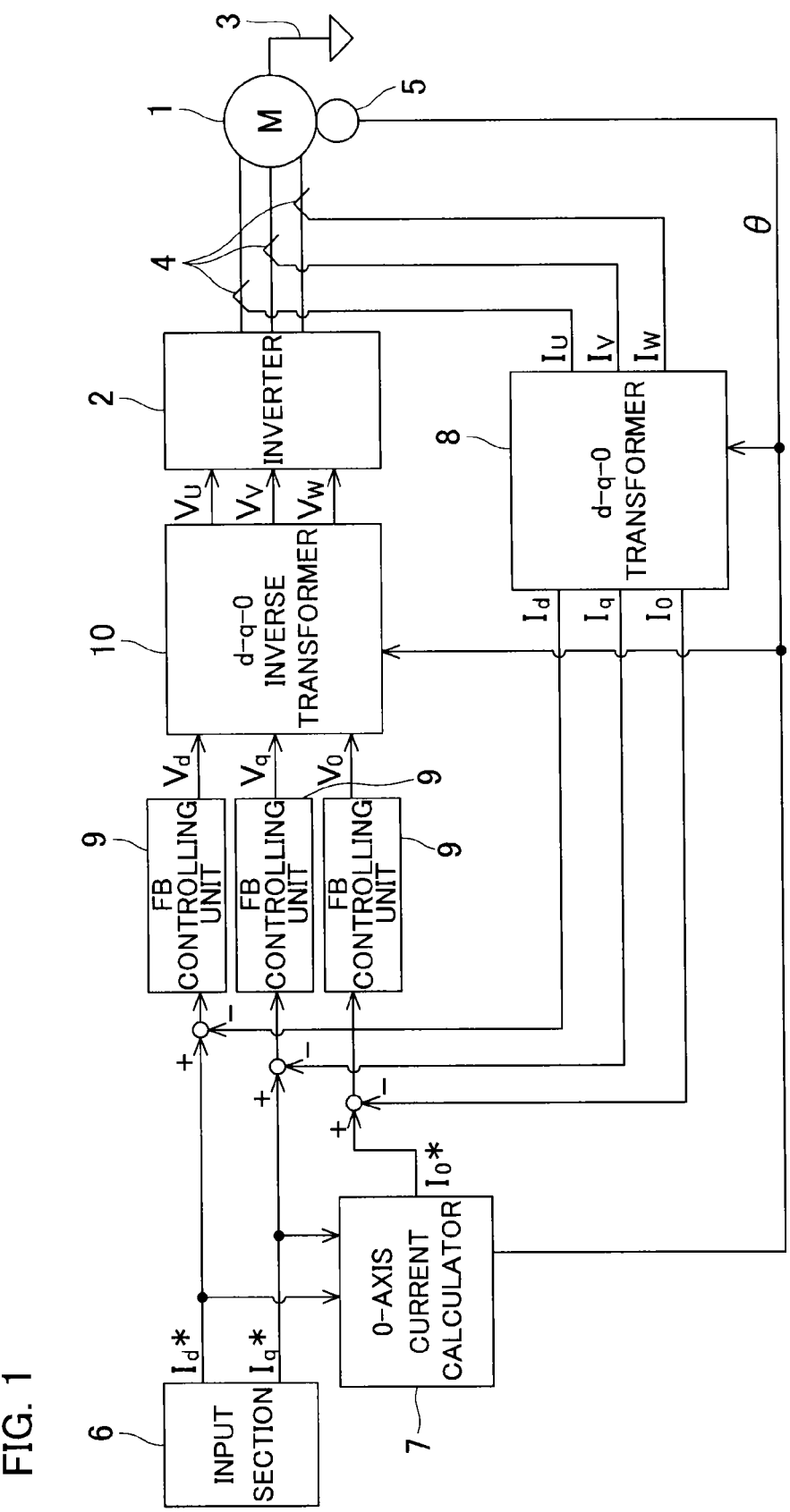
FIG. 1 is a control circuit diagram showing a motor controller of an embodiment.
Figure 2:
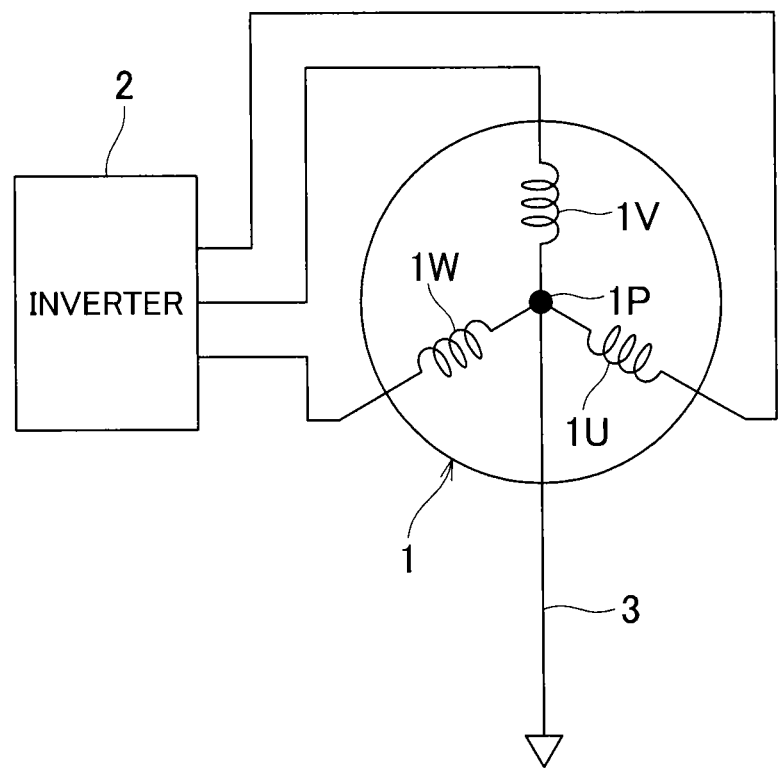
FIG. 2 shows a connection diagram of the motor shown in FIG. 1.

The following will describe an embodiment of the present invention with reference to figures. FIG. 1 is a control circuit diagram of a motor controller of the present embodiment. As shown in FIG. 2, the motor controller controls a three-phase motor 1 having coils 1U, 1V, and 1W of three phases U, V, and W, which are arranged in star connection. The coils 1U, 1V, and 1W of the respective phases are connected to an inverter 2, and a neutral line 3 which grounds the neutral point 1P of the star connection, a phase current detector 4 configured to detect a current running in each phase of the motor 1, and a magnetic pole detector 5 configured to detect, as an electrical angle θ, a magnetic pole rotational position of the motor 1. Examples of the magnetic pole detector 5 include sensors such as a resolver and an encoder, but a magnetic pole may be detected without using a sensor.

The motor controller further includes an input section 6, a 0-axis current calculator 7, a d-q-0 transformer 8, an FB controlling unit 9, and a d-q-0 inverse transformer 10. To the input section 6, target values Iq* and Id* of a q-axis current and a d-axis current, which are equivalent to target torque, are input. The 0-axis current calculator 7 calculates a target value I0* of a 0-axis current from the target values Iq* and Id* input to the input section 6 and the electrical angle θ detected by the magnetic pole detector 5. The d-q-0 transformer 8 transforms currents IU, IV, IW of the phases U, V, and W detected by the phase current detector 4 into a rectangular coordinate system of a d-axis current Id, a q-axis current Iq, and a 0-axis current I0, using the electrical angle θ detected by the magnetic pole detector 5 as a parameter. The FB controlling unit 9 performs feedback control of differences ΔId, ΔIq, and ΔI0 between the target values Id*, Iq*, and I0* of the currents of the d, q, and 0-axes and the currents Id, Iq, and I0 of the d, q, and 0-axes transformed by the d-q-0 transformer 8 by means of proportional-integral control, so as to output instruction voltages Vd, Vq, and V0 of the respective d, q, and 0-axes. The d-q-0 inverse transformer 10 inversely transforms the instruction voltages Vd, Vq, and V0 output from the FB controlling unit 9 into instruction voltages VU, VV, and VW of the phases U, V, and W, respectively. The instruction voltages VU, VV, and VW inversely converted by the d-q-0 inverse transformer 10 are input to the inverter 2. The inverter 2 conducts pulse width modulation of these instruction voltages VU, VV, and VW, and supplies an alternate current to each of the phases U, V, and W.

The d-q-0 transformer 8 transforms the currents IU, IV, and IW of the respective phases U, V, and W into the currents Id, Iq, and I0 of the d, q, and 0-axes, by the following Equation 1 employing the electrical angle θ as a parameter.

[Equation 1]

$$\begin{bmatrix} I_0 \\ I_d \\ I_q \end{bmatrix} = \sqrt{\frac{2}{3}} \begin{bmatrix} \frac{1}{\sqrt{2}} & \frac{1}{\sqrt{2}} & \frac{1}{\sqrt{2}} \\ \cos\theta & \cos\left(\theta - \frac{2\pi}{3}\right) & \cos\left(\theta - \frac{4\pi}{3}\right) \\ \sin\theta & \sin\left(\theta - \frac{2\pi}{3}\right) & \sin\left(\theta - \frac{4\pi}{3}\right) \end{bmatrix} \begin{bmatrix} I_U \\ I_V \\ I_W \end{bmatrix} \quad (1)$$

Furthermore, the d-q-0 inverse transformer 10 inversely transforms the currents Id, Iq, and I0 and the instruction voltages Vd, Vq, and V0 of the d, q, and 0-axes into the currents IU, IV, and IW and the instruction voltages VU, VV, and VW of the phases U, V, and W, by the following Equations 2 and 3.

[Equation 2]

$$\begin{bmatrix} I_U \\ I_V \\ I_W \end{bmatrix} = \sqrt{\frac{2}{3}} \begin{bmatrix} \frac{1}{\sqrt{2}} & \cos\theta & \sin\theta \\ \frac{1}{\sqrt{2}} & \cos\left(\theta - \frac{2\pi}{3}\right) & \sin\left(\theta - \frac{2\pi}{3}\right) \\ \frac{1}{\sqrt{2}} & \sin\left(\theta - \frac{4\pi}{3}\right) & \sin\left(\theta - \frac{4\pi}{3}\right) \end{bmatrix} \begin{bmatrix} I_0 \\ I_d \\ I_q \end{bmatrix} \quad (2)$$

[Equation 3]

$$\begin{bmatrix} V_U \\ V_V \\ V_W \end{bmatrix} = \sqrt{\frac{2}{3}} \begin{bmatrix} \frac{1}{\sqrt{2}} & \cos\theta & \sin\theta \\ \frac{1}{\sqrt{2}} & \cos\left(\theta - \frac{2\pi}{3}\right) & \sin\left(\theta - \frac{2\pi}{3}\right) \\ \frac{1}{\sqrt{2}} & \sin\left(\theta - \frac{4\pi}{3}\right) & \sin\left(\theta - \frac{4\pi}{3}\right) \end{bmatrix} \begin{bmatrix} V_0 \\ V_d \\ V_q \end{bmatrix} \quad (3)$$

The 0-axis current calculator 7 calculates the target value I0* of the 0-axis current as below, when open phase occurs in one of the three phases U, V, and W of the motor 1 and no current flows therein due to a failure such as disconnection. When no open phase occurs, the calculation is done with the assumption that the target value I0* is zero. The detection of the open phase is done by using a detection output from the phase current detector 4, but may be done by using another means for detection.

Based on the d-q-0 inverse transformation indicated by Equation 2, a current IX of a phase X which is one of the three phases U, V, and W is represented by the following Equation 4.

[Equation 4]

$$I_x = \sqrt{\frac{2}{3}} \begin{bmatrix} \frac{1}{\sqrt{2}} & \cos(\theta - \text{offset}) & \sin(\theta - \text{offset}) \end{bmatrix} \begin{bmatrix} I_0 \\ I_d \\ I_q \end{bmatrix} \quad (4)$$

The target value I0* of the 0-axis current when the phase X is open, i.e., when IX=0 is calculated by Equation 5, as a result of deformation of Equation 4 by setting the left side to zero.

$$I_0 = \sqrt{2}\{\cos(\theta - \text{offset}) \times I_d + \sin(\theta - \text{offset}) \times I_q\} \quad (5)$$

The offset indicates a difference between the phases. As shown in Table 1, the offset is determined based on which one of the phases U, V, and W becomes the phase X which is open.

TABLE 1

| Phase X | offset |
|---------|--------|
| Phase U | 0 |
| Phase V | $2\pi/3$ |
| Phase W | $4\pi/3$ |

Therefore, when one of the phases becomes open, as the FB controlling unit 9 performs feedback control by setting the 0-axis current as the target value I0* calculated by Equation 5, a control output with which compensation of certainly causing the open phase current to be zero is obtained, with the result that the target torque is controlled by a suitable control output, despite the presence of the above-described disturbance factors inherent to the motor such as the generation of an induced voltage.

Figure 3A:
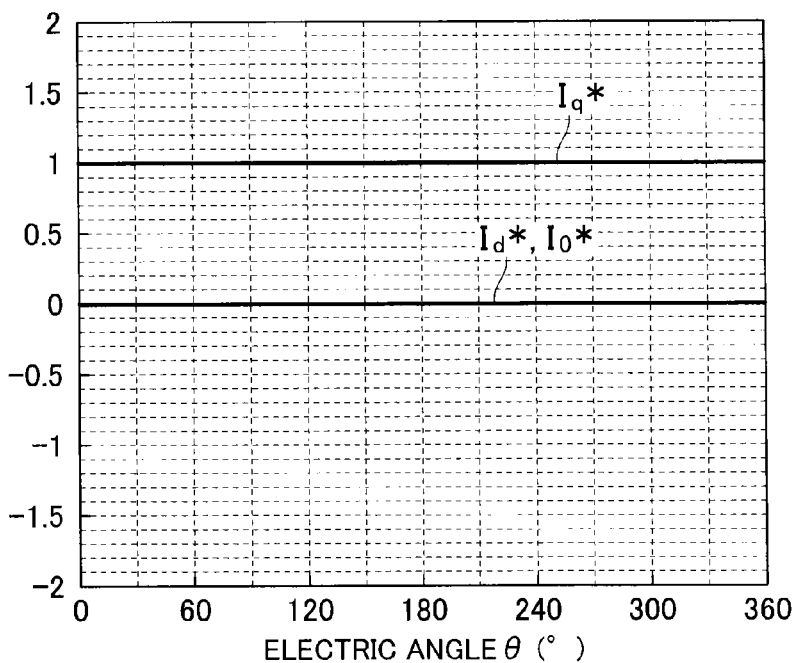
Figure 3B:
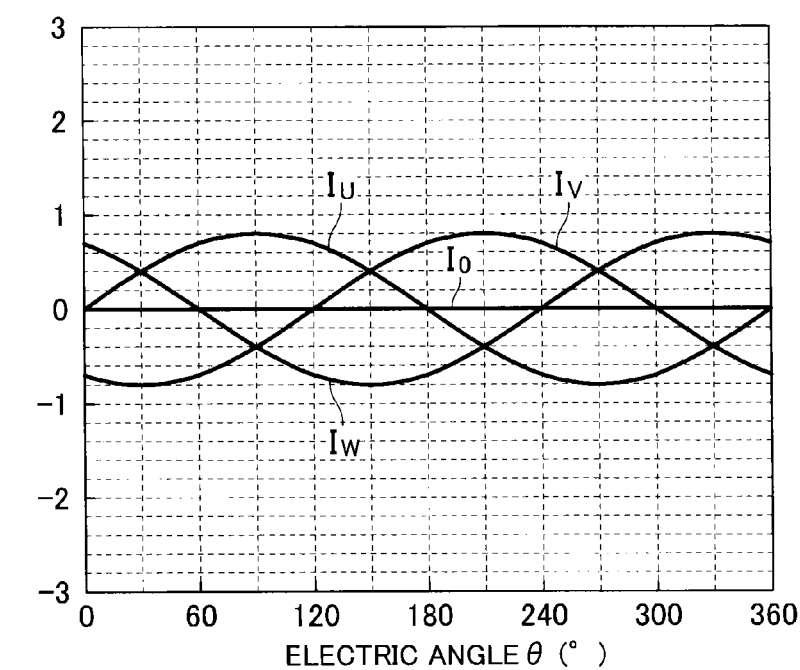
FIG. 3B is a graph showing currents of phases U, V, W, and 0 corresponding to the current target values in FIG. 3A.

FIGS. 3A and 3B show examples of control in the normal state in which open phase does not occur. FIG. 3A shows the target values Id*, Iq*, I0* of the d, q, and 0-axis currents with respect to the electrical angle θ, which are arranged such that the target value Iq* of the q-axis current, which is equivalent to the target torque, is constant at 1A, i.e., set to generate a constant torque, whereas the target value Id* of the d-axis current is 0A. The target value I0* of the 0-axis current calculated by the 0-axis current calculator 7 is also 0A.

FIG. 3B shows the currents IU, IV, and IW flowing in the respective coils 1U, 1V, and 1W of the phases U, V, and W and the current I0 that flows in the neutral line 3 which is the phase 0, with respect to the target values Id*, Iq*, and I0* which are shown in FIG. 3A. The waveforms of the currents IU, IV, and IW flowing in the respective phases U, V, and W are, as in the normal control, sine curves with the phases being different from one another each at 120 degrees in the electrical angles θ, and the 0-phase current I0 flowing in the neutral line 3 is controlled to be zero.

Figure 4A:
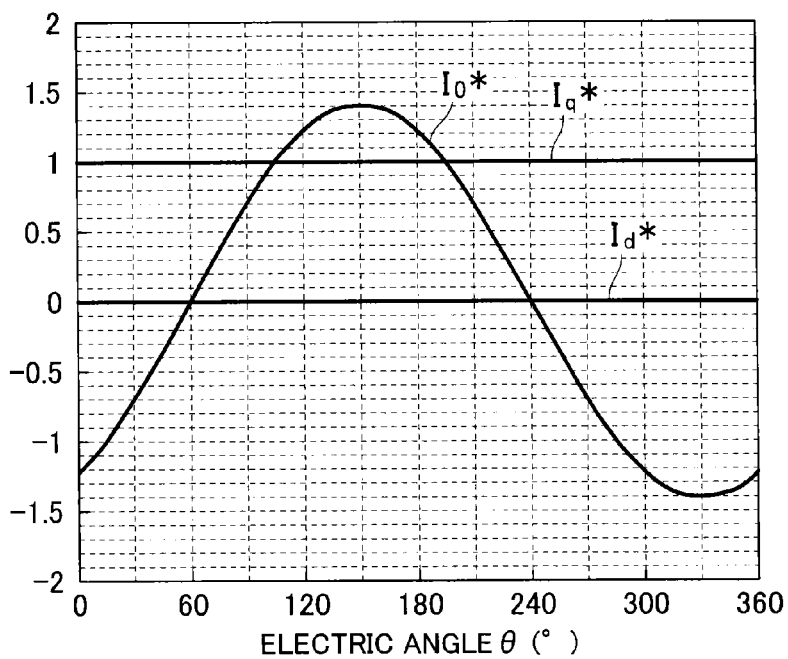
Figure 4B:
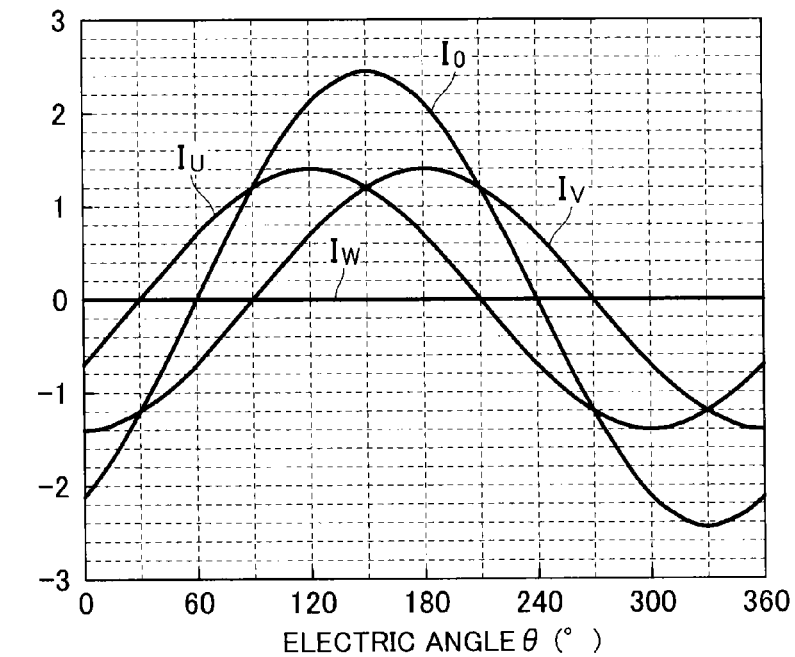
FIG. 4B is a graph showing currents of phases U, V, W, and 0 corresponding to the current target values of FIG. 4A.

FIGS. 4A and 4B show examples of control in the abnormal state in which the phase W is open. FIG. 4A shows the target values Id*, Iq*, and I0* of the d, q, and 0-axis currents with respect to the electrical angle θ, which are arranged such that, in the same manner as in the normal state, the target value Iq* of the q-axis current, which is equivalent to the target torque, is constant at 1A to generate a constant torque, whereas the target value Id* of the d-axis current is set at 0A. In the meanwhile, the target value I0* of the 0-axis current calculated from Equation 5 by the 0-axis current calculator 7 has a sine-curve waveform with the cycle of 360 degrees in the electrical angle.

FIG. 4B shows the currents IU, IV, and IW flowing in the coils 1U, 1V, and 1W of the phases U, V, and W and the current I0 which flows in the neutral line 3 of the phase 0 with respect to the target values Id*, Iq*, and I0* shown in FIG. 4A. In this case, the waveforms of the phase-U current IU and the phase-V current IV are sine curves with the phases being different from each other at 120 degrees in the electrical angles θ, whereas the waveform of the phase-0 current I0 flowing in the neutral line 3 is a sine curve calculated by multiplying the target value I0* of the 0-axis current by the square root of 3. The current IW of the phase W which is open is controlled to be zero. Although not illustrated, similar control is carried out when the phase U or the phase V is open. The phase-U current IU is controlled to be zero when the phase U is open, whereas the phase-V current IV is controlled to be zero when the phase V is open.

As described above, the motor controller of the present invention is able to perform stable control with a constant target torque both in the abnormal state with open phase and in the normal state. Furthermore, it is possible to make most of the advantages of vector control by a simple arrangement, without switching the control loop between the normal state and the abnormal state. Furthermore, it is possible to control the open phase current to be zero by a suitable control output, despite in the presence of disturbance factors inherent to the motor such as the generation of an induced voltage.

While in the embodiment above the motor which is the target of control is a three-phase motor, the motor controller of the present invention may be able to control a polyphase motor with four or more phases. When there are four or more phases, the control above works on condition that two or more normal phases remain, even if more than one phase are open.

While in the embodiment above the FB controlling unit performs feedback control by means of proportional-integral control, the FB controlling unit is not limited to the embodiment above. The feedback control may be done by means of at least one of proportional control, integral control, and derivative control, or by means of a combination of them.

What is claimed is:

1. A motor controller comprising:
an inverter configured to apply a voltage to each phase of a motor having coils of three or more phases arranged in star connection so as to supply an alternate current to each phase; a phase current detector configured to detect the current flowing in each phase of the motor; and a magnetic pole detector configured to detect a magnetic pole rotational position of the motor,
the current supplied to each phase of the motor being controlled based on target values of a q-axis current and a d-axis current which are equivalent to target torque, a current of each phase detected by the phase current detector, and the magnetic pole rotational position detected by the magnetic pole detector,
the motor controller further comprising:
a neutral line which grounds a neutral point of the star connection;
a d-q-0 transformer configured to transform the current of each phase detected by the phase current detector to a rectangular coordinate system of the d-axis current, the q-axis current, and a 0-axis current, by using the magnetic pole rotational position detected by the magnetic pole detector as a parameter; and
a 0-axis current calculator configured to calculate a target value of the 0-axis current by setting the current of the open phase to be zero when one of the phases of the motor becomes open and no current flows to the one of the phases, or determines that the target value of the 0-axis current is zero when there is no open phase, and
based on the target values of the d-axis current and the q-axis current, the target value of the 0-axis current calculated by the 0-axis current calculator, and the d-axis current, the q-axis current, and the 0-axis current transformed by the d-q-0 transformer, the current supplied to each phase of the motor being controlled.

* * * * *